United States Patent Office 3,068,764
Patented Dec. 18, 1962

3,068,764
ASPHALT SURFACES BEARING PROTECTIVE COATINGS AND PROCESS FOR THE FORMATION THEREOF
Richard C. Nelson, Walnut Creek, Calif., assignor to Shell Oil Company, a corporation of Delaware
No Drawing. Filed Aug. 19, 1959, Ser. No. 834,644
6 Claims. (Cl. 94—22)

This invention relates to the preparation of polymerized protective coatings on asphalt surfaces. More particularly, the invention relates to a novel process for grafting polymerized photo polymerizable vinyl type monomers on the surface of asphalts to produce polymeric protective grafted coatings thereon.

One of the serious problems in the asphalt surfacing industry dealing particularly with those asphalt surfaces which have to bear automotive or aircraft traffic is that the various compositions laid down, such as for toppings or road surfaces, have not been satisfactory in withstanding spillage of hydrocarbon fuels and lubricating oils. When used as surface coatings on airport runways, in automobile garages, service station pavements or on any other surface where spillage of oil products occurs, most of the known asphaltic compositions have been reported to suffer from the serious defect of softening and dispersing readily in the spilled hydrocarbon fuels or lubricating oils. This situation has resulted in relatively rapid deterioration and disruption of previously known asphaltic surfaces to the extent that they usually become unfit for such use in a short time. In fact, in some areas, particularly where jet fuels are subject to spillage, asphalt pavements have been barred due to this sensitivity.

It has been previously suggested to incorporate certain polymeric materials and natural rubbers in asphalt. However, many of these cause the compositions to deteriorate rapidly under action of contacting hydrocarbon fractions and will usually peel and crack off under the influence of the climatic changes. Additionally, none of the asphaltic compositions containing natural rubber have solved the problem of providing an adherent and lasting sealing coat for asphaltic pavements or surfaces which were at the same time compatible with and sufficiently adhesive to the asphaltic surface below and which would not disintegrate under the action of hydrocarbon fractions which normally spill or leak from machinery or vehicles located on them.

The problem of providing satisfactory solvent resistant coatings on asphalt surfaces exists not only upon the initial laying of such surfaces but also during their life time periodically due to the action of wear and weather, it is usually necessary to improve or repair such surfaces. Hence, it would be highly desirable to provide pavements already laid with a protective coating designed to improve or minimize one or more of the limiting inherent properties of asphalts. Such properties include not only the sensitivity to hydrocarbon solvents, but also their tendency to oxidize, crack, harden and particularly to burn. It would be especially beneficial if a means could be provided for the preparation of coatings which are fire resistant. Such coatings should not only be capable of being formed on new asphalt surfaces but on already existing surfaces.

The surface may not be necessarily in the form of a pavement of appreciable thickness. They may, on the other hand, be bituminous waterproofing coatings or impregnants on textiles, such as canvas and the like or paper, and roofing felts. Fireproofing is especially desirable for such situations and the periodic renewal of fireproofing treatments would be particularly desirable.

It is an object of the present invention to provide novel asphaltic compositions which obviate the above and other defects and which have unique characteristics rendering them particularly suitable as coatings for asphaltic surfaces. It is another object of the invention to provide a seal coat for asphaltic surfaces which will adhere firmly to the foundation surface and in which the components of the seal coat are not only grafted to each other but are also compatible with the asphaltic surface being coated, said seal coating being of such a character that it presents an exposed surface which will not be dispersed by and will not otherwise deteriorate upon any substantial hydrocarbon oil spillage thereon. Still another object is to provide a seal coat of the character described which does not crack or peel under the influence of air, sunlight, or general weather conditions and if designed for the purpose of fireproofing will present a highly fire resistant surface in addition to the solvent resistance primarily desired.

Now, in accordance with the present invention, asphaltic surface coatings are provided by the surface graft polymerization of vinyl-type monomers to the surface of asphalt. In further accordance with the invention a process is provided for the production of such grafted polymer-asphalt compositions which comprises exposure of vinyl-type monomers in contact with an asphalt surface to the polymerization action of light, preferably sunlight, whereby the vinyl monomer graft polymerizes, forming a polymeric coating grafted to the surface of the asphalt.

A specific utilization of this invention comprises the solvent resistance improving step of laying down an aqueous dispersion of the vinyl-type monomer, as more particularly described hereafter, on the surface of a preformed asphalt pavement and allowing the action of sunlight to cause and/or accelerate polymerization of the monomer to form a coating grafted to the asphalt surface. Of course, it is possible to form the photo polymerized coating grafted to the asphalt surface by exposure of an aqueous dispersion of the monomer in physical contact with an asphalt surface by passing the combination under a more concentrated light source, such as ultra violet lamps. However, the desirable aspects of this invention comprise the in situ polymerization of the vinyl-type monomer on an asphalt surface as a grafted polymer at ambient temperatures and in the presence of sunlight.

The specific vinyl-type monomer which may be employed for the described purposes will vary according to the severity of the conditions to which the eventually formed composition will be subjected and secondly, will depend upon the specific objectives for which the grafted coating is being prepared. For example, if solvent resistance is the most desired property to be improved in the asphalt coating, then a vinyl monomer such as acrylamide is to be chosen. However, if fire resistance is desired, a grafted polymeric coating may be prepared from contact with a halogen containing vinyl monomer such as methacrylchloride. Copolymers may be utilized for specific purposes if such are desired.

The polymerization and copolymerization of vinyl monomers are matters well known in the art of polymerization. With respect to the use of polymers in asphalts it has been the common practice to polymerize such monomers prior to their incorporation in asphalt and hence, the asphalt itself has not taken part in the polymerization. In the present instance, the asphalt acts not only as a photo sensitizer but also actually is directly and chemically grafted to the polymer so formed on its surface.

Suitable monomers to be used in accordance with this invention are those having an alpha-, beta-unsaturated linkage and preferably in which one of the carbon atoms bearing this linkage also bears a polar radical of a strongly negative type, including halogen cyanide, ketone, carboxyl, nitrile, ester or amide radicals. One or the other of the carbon atoms bearing the unsaturated (ethylenic) linkage may also bear an alkyl or aryl hydrocarbon group in place of or in addition to hydrogen atoms. The most preferred compounds have the formula $CH_2=CRX$ wherein R is a hydrogen atom or a hydrocarbon radical having less than 6 carbon atoms and X is one of the polar radicals referred to. Typical members of these preferred groups include acrylamide, acrylic acid, acrolein, vinyl chloride, acrylonitrile, methyl acrylate, vinyl acetate, ethyl acrylate, methacrylamide and methyl methacrylate. Copolymers of these photo polymerizable monomers may be formed, preferably from the monomers listed herewith.

It is preferred that water-soluble monomers be utilized but aqueous dispersions, such as emulsions, may be employed if this is necessary or desirable. The concentration of the monomer in the aqueous dispersion is preferably between about 1% and about 60% based on the total aqueous dispersion. Preferably this concentration is in the range of 10–50%, concentrated solutions such as those having between 25 and 45% being optimum. Under these conditions the volume of aqueous dispersion which requires handling is minimized and thereby the cost of the operation is reduced.

The proportion of aqueous dispersion to asphalt surface is not critical but it is preferred that a sufficient amount of the dispersion be employed to provide a polymeric coating grafted to the surface which will be between about 0.2 and about 2 millimeters in thickness. When employing aqueous dispersions having more than about 10% by weight of monomer in them, the proportion of aqueous dispersion is preferably such that the aqueous layer is between about 1 and about 2 millimeters in depth on the surface. The necessary condition is that the asphalt surface be kept wet with polymer solution or dispersion. Under these circumstances, the polymeric grafted coating formed thereby is highly effective for the intended purpose without materially altering other important properties of the asphalt surface, such as plasticity, penetration, elongation, viscosity-temperature relationships, etc.

The asphalt to be graft-linked with the polymerized coating may comprise the surface of an asphalt coating or paving already laid in place as the sole asphalt body. Alternatively, the surface to be protected may be superficially coated with a very thin coating (0.1–1 millimeter) of asphalt to which the vinyl compound is then graft polymerized. This may be of advantage, for example, in the coating of other polymeric materials, such as rubber and the like, which, in the absence of asphalt, require the presence of accelerators for graft polymerization of vinyl monomers on their surface if a photo sensitizer is not present. Of course, the grafted polymeric coatings are renewable from time to time as required if and when they require rejuvenation, such as might occur where traffic is heavy or use is extreme.

The conditions under which the polymers are grafted to the asphalt may vary within reasonably wide limits. For example, the graft polymerization may occur in the presence or absence of oxygen-containing gases, such as air; the temperature may be any temperature between about −20° C. and the boiling point of water; the time will normally be between a brief exposure in the order of a few seconds for highly polymerizable materials (acrolein) or substantially longer periods up to as long as about one week for materials having a slower rate of graft polymerization.

The intensity and wave length of the light employed for the photo polymerization process to occur will have an influence on the time and degree of polymerization. Preferably, the wave length is in the range of 1800 to 7000 Angstroms and most preferably within the wave lengths of sunlight. Following graft polymerization of the vinyl type monomers, it may be advisable to wash off any remaining monomeric aqueous dispersion from the surface, although when the pavement is one which is exposed to weather this may be taken care of in due course by rain or snow.

One use of the asphalt grafted polymers comprises improving fire resistance of asphaltic-impregnated articles of commerce, such as roofing materials and the like. In such situations and particularly with respect to roll roofing, it is common practice to prepare the asphalt coated roofing and store it in the form of rolls prior to its being laid down in place on a roof surface. Under these conditions, of course, it is particularly amenable to treatment with photo polymerized vinyl polymers where the source of light is not natural sunlight but is a light source of greater intensity, such as ultra-violet lamps and the like placed in close juxtaposition to the roll roofing passing beneath it, preferably on a moving belt. Under these circumstances the degree of polymerization and the relative proportions of aqueous dispersions of the monomers to asphalt surface areas may be closely controlled.

The unexpected feature of the present invention comprises the discovery that asphalts act as photo initiators for the graft polymerization of vinyl-type monomers, even if other known initiators, such as benzophenone are not utilized. This is contrary to the experience encountered in the graft polymerization of vinyl monomers on the surface of rubber. For example, substantial amounts (in the order of 7%) of benzophenone must be dispersed in the rubber before vinyl monomers will graft polymerize on the surface thereof when exposed to ultra-violet light. If accelerators or initiators are employed in the present process, it may reduce the time of polymerization required to reach a given molecular weight but they are not essential to attain a satisfactory graft polymerization on the surface of asphalt.

The following examples illustrate the process and product of this invention:

Example I

A 30% aqueous solution of acrylamide was used to cover the surface of 85–100 penetration straight-run asphalt to a depth of about one millimeter. The combination was exposed to sunlight at 90° F. for 4–5 hours, after which the remaining aqueous solution was washed off and a treated asphalt surface dried. The superficial coating of polymerized acrylamide grafted to the asphalt surface provided it with a solvent resistant character which it did not have before the described treatment.

Example II

A blown asphalt roofing paper was contacted with 0.5 inch of depth of a 25% aqueous solution of chlormethylmethacrylate and exposed to ultra-violet lamp radiation for 30 minutes at 100° F. This resulted in a graft polymerized coating of chlormethylmethacrylate on the surface of the asphalt and resulted in an improvement in the fire resistance of the roofing composition.

Asphalts amenable to the preparation of grafted vinyl-type polymer coatings thereon include straight-run asphalts, propane asphalts, airblown asphalts, catalytically blown asphalts (the catalyst being ferric chloride, phosphorus pentaoxide, phosphoric acid, aluminum chloride, etc.) and asphalts modified by the presence of other bituminous substances, such as coal tars, wax tank bottoms, polymerized olefins and the like.

I claim as my invention:

1. A process for improving the solvent resistance of asphalt pavements which comprises depositing an aqueous solution of acrylamide on and in direct contact with said asphalt and irradiating the amide with sunlight, whereby the acrylamide is photo sensitized by the asphalt and polymerizes, and a solvent resistant graft copolymeric film with the asphalt is formed.

2. A process for polymerizing chlormethylmethacrylate on an asphalt pavement which comprises irradiating, with light of wave lengths in the range of 1800 to 7000

Angstroms, an aqueous solution consisting essentially of water and chlormethylmethacrylate and containing no material which activates the polymerization, the solution being in direct contact with the asphalt surface and irradiation being continued for a time to form a graft copolymer film with the asphalt surface.

3. A process for polymerizing vinyl-type monomers having the general configuration

wherein R is a substituent of the group consisting of hydrogen atoms and hydrocarbyl radicals and X is a substituent of the group consisting of —F, —Cl, —Br, —I, —CN, —CHO, —CONH$_2$, —COCH and —COO alkyl and mixtures of such monomers which comprises exposing an aqueous dispersion of the monomer in direct contact with an asphalt pavement to irradiation with light of wave lengths in the range 1800 to 7000 Angstroms for a time sufficient to form a graft copolymer film of the polymerized monomers with the asphalt surface.

4. A process according to claim 3 wherein the source of irradiation is sunlight and irradiation is conducted at atmospheric temperatures.

5. A process according to claim 3 wherein the monomer is one in which R is hydrogen.

6. A process according to claim 3 wherein the monomer is one in which R is an alkyl radical having 1–5 carbon atoms.

References Cited in the file of this patent

UNITED STATES PATENTS

| | | |
|---|---|---|
| 2,545,963 | Mack | Mar. 10, 1951 |
| 2,684,305 | Quinlivan | July 20, 1954 |
| 2,718,515 | Thomas | Sept. 20, 1955 |
| 2,769,726 | Wetterau | Nov. 6, 1956 |
| 2,918,940 | Carr | Dec. 29, 1959 |
| 2,925,831 | Welty | Feb. 23, 1960 |

OTHER REFERENCES

Engineering Properties and Applications of Plastic by Kinney, pp. 248–250, published 1957 by Wiley and Sons.